3,218,267
PREPARATION OF CATALYST BY TREATMENT
OF ALUMINA WITH THIONYL CHLORIDE
Anthony George Goble, John Norman Haresnape, and
Thomas Campbell O'May, all of Sunbury-on-Thames,
Middlesex, England, assignors to The British Petroleum
Company Limited, London, England, a British joint-
stock company
No Drawing. Filed June 13, 1963, Ser. No. 287,475
Claims priority, application Great Britain,
June 26, 1962, 24,495/62
7 Claims. (Cl. 252—439)

This invention relates to chlorine containing catalysts suitable for use in hydrocarbon conversion processes and to methods of preparing them.

The complete specification of cognate U.K. patents applications Nos. 30,821/60 and 36,154/60 claims a process for preparing a catalyst suitable for use in an isomerisation process by contacting alumina with a compound of general formula

(where X and Y may be the same or different and selected from H, Cl, Br, F or SCl, or where X and Y together may be O or S) under non-reducing conditions and at a temperature such that chlorine is taken up by the aluminium chloride. The catalyst is suitable for use in hydrocarbon conversion processes, particularly the isomerisation of $C_4$ or higher paraffin hydrocarbons boiling within the gasoline boiling range, i.e., up to 400° F. (204° C.) at temperatures below 400° F. (204° C.).

A further compound which can be used to prepare the catalyst has now been found.

The active catalyst sites are formed by reaction of the chlorinating compound with certain reactive surface groups, for example hydroxyl groups, with loss of an oxygen atom. The oxygen is given off as a compound, which depending of the chlorinating compound used, may be carbon dioxide, phosgene, or a sulphur oxide. Water is also a reaction product, and it has been found that the production of active catalysts is accompanied by a progressive loss of hydrogen from the catalyst.

According to the present invention a process for preparing a catalyst suitable for use in hydrocarbon conversion processes comprises contacting alumina with thionyl chloride ($SOCl_2$) under non-reducing conditions and at a temperature of from 300 to 1100° F. (149 to 593° C.) such that chlorine is taken up by the alumina without the production of free aluminium chloride. The method of preparation using this particular chlorine compound is essentially the same as that disclosed in the complete specification of cognate U.K. patent applications Nos. 30,821/60 and 36,154/60, the salient features of which are as follows.

Any convenient form of alumina may be used which contains active surface groups, and it is a characteristic of activated aluminas normally used as hydrocarbon treatment catalysts that, although predominantly alumina, they do contain a small amount of hydrogen, usually less than 1% wt. This hydrogen is generally considered to be in the form of surface groups, for example hydroxyl groups, which form acid or potentially acid sites. As exemplification of the state of knowledge on the hydrogen content of inorganic oxides reference may be made to "Structure and Texture of Aluminas," by B. C. Lippens. At page 75 the term "alumina" is used to define aluminium hydroxides obtained by dehydration of hydroxides in an analogous manner to the term silica indicating that these compounds can have a (variable) water content. In particular Lippens separates out rho, chi, eta and gamma aluminas as low temperature aluminas: $Al_2O_3.nH_2O$ in which $0<n<0.6$; obtained by dehydrating at temperatures not exceeding 600° C. and distinguishes these from kappa, theta and delta aluminas, these latter being high temperature aluminas: nearly anhydrous $Al_2O_3$; obtained at temperatures between 900 and 1000° C. In the same book at page 84, it is stated that the water is not present as isolated $H_2O$-molecules but as OH— groups. Any of the forms of alumina suitable as a base for reforming catalysts may be used, but a particularly preferred form is one derived from an alumina hydrate precursor in which the trihydrate predominates. One containing a major proportion of β-alumina trihydrate is particularly suitable. A convenient method of preparing the alumina is by hydrolysis of an aluminium alcoholate, for example, aluminium isopropoxide, in an inert hydrocarbon solvent, for example, benzene.

Preferably the catalyst contains less than 50% wt., and more particularly less than 25% wt., of a metal or metal compound having hydrogenating activity selected from Groups VIa or VIII of the Periodic Table. The percentage of the hydrogenating component is calculated as weight of metal by weight of total catalyst. The preferred metal is platinum group metal which may be present in an amount from 0.01 to 5% wt., preferably 0.1 to 2% wt. The preferred platinum group metals are platinum and palladium.

The hydrogenating metal, if present, is desirable incorporated with the alumina prior to the chlorination. Thus a suitable material for chlorination is one of the known platinum-alumina reforming catalysts.

The non-reducing conditions used for the chlorination may be either inert or oxidising conditions, the latter being preferred since they give catalysts which lose activity more slowly during low temperature isomerisation. A convenient method of contacting the alumina is to pass a gaseous stream of the chlorine compound over the alumina either alone or, preferably, in a non-reducing carrier gas. Preferred carrier gases are oxidising gases and examples of suitable carrier gases are nitrogen, air or oxygen.

Non-reducing conditions are essential, since reducing conditions tend to convert the chlorine compound to hydrogen chloride, which gives an inactive catalyst. The temperature for the chlorination is, as stated above, from 300–1100° F. (149–593° C.). The tendency to form free aluminium chloride increases with temperature and care should, therefore, be exercised when using the higher temperatures within the stated range. Since the temperatures used will normally be above the volatilisation temperature of aluminium chloride the formation of free aluminium chloride is readily detected by its appearance in the gaseous reaction products. When treating a platinum group metal-alumina composite, care should also be exercised to prevent the formation of volatile platinum complexes, the tendency for the formation of such complexes again increasing with increasing temperature. When treating platinum group metal-alumina composites the temperature is preferably 300–700° F. (149–371° C.), platinum-on-alumina composites being more particularly treated at 450–600° F. (232–316° C.). The chlorination reaction is exothermic and the temperatures specified are the initial temperatures used.

The chlorine content of the catalyst in terms of percent weight, will normally be within the range 1 to 15% wt. and will depend on the number of active sites on the original alumina, which, for any given alumina, will in its turn be related to the surface area of the alumina. The preferred chlorine contents are thus within the range $2.0 \times 10^{-4}$ to $3.5 \times 10^{-4}$ grams/sq. metre of surface area of the original alumina. Chlorine contents in excess of this amount are likely to indicate either that the alumina itself has undergone alteration or that the chlorine is not all properly combined with the active sites. Other things being equal, the greater the amount of chlorine associated with the alumina, the greater is the activity of the catalyst and since, as stated above, the maximum amount of chlorine which can be present is related to the surface area, it is desirable that the chlorinated alumina should have a high surface area, for example more than 250 m.$^2$/g. and preferably more than 300 m.$^2$/g. With the preferred chlorine contents per unit of surface area the total wt. of chlorine may be from 6 to 15% wt., more particularly 9 to 15% wt.

The rate of addition of the chlorine compound is preferably as low as practicable to ensure uniform chlorination and to avoid a rapid increase of temperature as a result of the exothermic reaction. Preferably the addition rate does not exceed 1.3% wt. of chlorine compound by weight of catalyst per minute. If a carrier gas is used, the rate of flow is preferably at least 200 volumes/volume of catalyst/hour and a convenient range is 200–1000 v./v./hr. The pressure used is conveniently atmospheric. The length of time of the treatment to give the required uptake of chlorine without the formation of free aluminium chloride will normally be within the range 5 minutes to 5 hours.

With catalysts prepared from thionyl chloride some sulphur may be taken up by the catalyst. This sulphur is preferably present on the catalyst in as low an amount as possible when the catalyst is used since it may affect the catalyst activity. The sulphur content may be kept to a minimum either by using an oxidising gas as the carrier gas for the thionyl chloride during the catalyst preparation or by subsequently contacting the chlorinated catalyst with an oxygen containing gas at an elevated temperature, preferably at 500 to 1000° F., and more particularly at 600 to 900° F. for a suitable time, for example, 1 to 24 hours.

The active catalyst is susceptible to hydrolysis in the presence of water and should, therefore, be stored under anhydrous conditions. Similarly the materials used in the catalyst preparation should also be free from water.

When using a platinum group metal it is also desirable that it should be finely dispersed as small crystallites on the alumina, suitable criteria for the size of the crystallites being that they are not detectable by X-ray diffraction or that on treatment of the platinum group metal-alumina composite with benzene at 250° C. they have a measurable benzene chemisorption, preferably not less than 0.1 molecule of benzene absorbed/atom of platinum and not less than 0.03 molecule of benzene absorbed/atom of palladium. Details of the benzene chemisorption technique have been published in "Actes du Deuxieme Congres International de Catalyse," Paris, 1960, vol. 2, page 1851.

A convenient method of obtaining the platinum group metal in the required state of sub-division is to add a solution of a platinum group metal compound to a hydrogel of the alumina and to precipitate the platinum group metal as a sulphide, for example by treatment with hydrogen sulphide. The treatment of the platinum group metal-alumina composite with the chlorine compound is preferably given with the platinum group metal in a reduced state, and this can conveniently be achieved by pre-treating the composite with hydrogen. When a platinum group metal-alumina composite is treated with a chlorine compound according to the present invention it is believed that a portion of the chlorine taken up is associated with the platinum group metal as an active complex.

Catalysts prepared by the process of the present invention have the characteristic of forming coloured complexes on treatment of the catalyst with dry benzene or dry toluene.

The treatment of the catalyst to form the aromatic complex may be a simple treatment of the catalysts, for example by immersion, at atmospheric temperature for a short period of the order of a few minutes, for example, 1 to 5 minutes. Relatively small amounts of the aromatics only are required. Since, however, the active catalyst sites are susceptible to hydrolysis, dry conditions are advisable for the treatment, and the storage of the catalysts. In the case of catalysts containing platinum as a hydrogenating component the complex is stable and the colour will persist for many months. In the case of catalysts consisting only of alumina and chlorine the colour may disappear on flushing with dry nitrogen.

The catalysts of the present invention have activity for a number of low temperature hydrocarbon conversion reactions, particularly low temperature isomerisation. The present invention, therefore, includes a process for the isomerisation of $C_4$ and higher paraffin hydrocarbons boiling in the gasoline boiling range (i.e., up to 400° F.) which comprises contacting the hydrocarbons in the presence of hydrogen and at a temperature below 400° F. with a catalyst prepared as described above.

The feedstock to the low temperature isomerisation process is preferably one consisting predominantly of pentanes, hexanes or a mixture of these paraffins. If it is desired to isomerise normal paraffins only, the feedstock may first be treated to separate normal paraffins from the other hydrocarbons and the normal paraffins contacted with the isomerisation catalyst.

The product of the isomerisation reaction may similarly be treated to recover unconverted normal paraffins which may be recycled to the isomerisation reaction zone.

The feedstock is advantageously free of sulphur, water and aromatic hydrocarbons. It also has, desirably, a low content of naphthenic hydrocarbons.

The isomerisation may be carried out under the following conditions, in either liquid or vapour phase.

| | |
|---|---|
| Temperature | 50–400° F., preferably 150–350. |
| Pressure | Atmospheric—2000 p.s.i.g., preferably 225–1000. |
| Space velocity | 0.05–10 v./v./hr. preferably 0.2–5. |
| Hydrogen:hydrocarbon mole ratio | 0.01–20:1, preferably 1.5–15:1. |

If desired, hydrogen chloride or a compound giving rise to it under the reaction conditions (for example, carbon tetrachloride) may be added to the reaction zone, either directly or by addition to the feedstock or hydrogen-containing gas used. The chloride may be present in an amount of from 0.01 to 5% wt. of chlorine by weight of feedstock, preferably 0.1 to 1% wt.

The invention is illustrated by the following example.

*Example*

Two catalysts were prepared as follows:

*Catalyst A.*—65 g. of a platinum-alumina composite comprising 0.55 percent weight platinum and 0.81 percent weight chlorine on alumina, and having a surface area of 450 m.$^2$/g. in the form of $\frac{1}{16}$ inch diameter extruded rods, were charged to a glass reactor. A downward gas flow, 45 litres/hour of dry nitrogen at atmospheric pressure, was established through the reactor and the catalyst bed temperature was raised to and controlled at 580° F.

After 2 hours drying in the nitrogen stream at 580° F. a vessel containing 250 g. thionyl chloride chilled to 0° C. in an ice/water bath was inserted in the nitrogen gas line upstream of the reactor. Treatment of the platinum-alumina composite was commenced by bubbling the nitrogen carrier gas through the chilled thionyl chloride vessel, the gases then flowing downward through the reactor, the catalyst bed being initially at a temperature of 580° F.

An exothermic reaction commenced almost immediately, the catalyst bed temperature rising to 625° F. 10 minutes after the treatment commenced. At the end of 2 hours, when 21.8 g. thionyl chloride had been passed through the catalyst bed, the treatment was discontinued. The treated catalyst was further purged with nitrogen at 580° F. for 2 hours, and then cooled back to room temperature under nitrogen flow.

The treated catalyst was discharged to a dry air-tight container ensuring minimum exposure of the catalyst to the atmosphere. The weight of the treated catalyst was 65.7 g.

*Catalyst B.*—25 g. of catalyst A were charged to a glass reactor and a purge of 45 litres/hour dry air was set up through the reactor. The catalyst bed temperature was raised to 900° F. at a rate of 100° F./hour and held at this temperature for 2 hours. After cooling back to room temperature the catalyst was discharged to an air-tight, dry container in the same manner as for Catalyst A.

Small samples of Catalysts A and B were analysed to give the following data:

| Catalyst | A | B |
|---|---|---|
| Chlorine, percent wt | 12.35 | 9.5 |
| Hydrogen, percent wt | | 0.12 |
| Carbon, percent wt | | 0.02 |
| Sulphur, percent wt | 0.7 | 0.4 |
| Sulphate, percent wt | 1.71 | |
| Surface area, m.$^2$/g | 330 | 315 |
| Pore volume, ml./g | 0.29 | 0.29 |

Inspection of these data shows the following chlorine surface properties for the two catalysts:

| Catalyst | A | B |
|---|---|---|
| Chlorine, g./sq.m of original alumina surface area | 2.74×10$^{-4}$ | 2.11×10$^{-4}$ |
| Chlorine, g./sq.m of chlorinated catalyst | 3.75×10$^{-4}$ | 3.02×10$^{-4}$ |

The activity test results for low temperature isomerisation of these two catalysts are given below. In the table which follows "HOS" refers to—hours on steam. The feedstock used was a desulphurised and dearomatised C$_6$ cut from a light gasoline.

| | |
|---|---|
| Temperature, ° F. | 270 |
| Pressure, p.s.i.g. | 250 |
| Hydrogen:hydrocarbon mol ratio | 2.5:1 |
| Liquid hourly space velocity, v./v./hr. | 1.0 |
| CCl$_4$ concentration in feedstock, percent wt. | 0.1 |

| Catalyst | A | B |
|---|---|---|
| Conversion to 2,2-dimethylbutane at— | | |
| 3 HOS, percent wt | 7 | 23.5 |
| 12 HOS, percent wt | 0.5 | 24 |
| 21 HOS, percent wt | | 24 |
| 27 HOS, percent wt | | 26.5 |

A sample of Catalyst B which had been stored in a closed container for 20 months was treated with dry benzene and dry toluene by immersion in an excess volume of the aromatic hydrocarbon at room temperature (22° C.)

Coloured complexes were formed as follows:

Benzene yellow
Toluene olive green.

We claim:
1. A method of preparing a catalyst, suitable for use in hydrocarbon conversion processes, comprising contacting alumina with thionyl chloride under non-reducing conditions and at a temperature of from 300 to 1100° F. such that chlorine is taken up by the alumina without the production of free aluminium chloride.

2. A method as claimed in claim 1 wherein the weight of chlorine taken up is from $2.0 \times 10^{-4}$ to $3.5 \times 10^{-4}$ grams/sq. metre of surface area of the original alumina.

3. A method as claimed in claim 2 wherein the surface area is at least 300 m.$^2$/g. and the chlorine taken up is from 6 to 15% wt. by weight of total catalyst.

4. A method as claimed in claim 1 wherein the catalyst contains less than 50% wt., calculated as weight of metal by weight of total catalyst, of a metal having hydrogenating activity selected from Groups VIa and VIII of the Periodic Table.

5. A method as claimed in claim 4 wherein the hydrogenating component is from 0.01 to 5% wt. of a platinum group metal.

6. A method as claimed in claim 1 wherein the thionylchloride is passed over the alumina in a stream of an oxidising carrier gas.

7. A method as claimed in claim 1 wherein the thionyl chloride contacts a composite of alumina and a platinum group metal at a temperature of from 300 to 700° F.

References Cited by the Examiner

UNITED STATES PATENTS

| | | | |
|---|---|---|---|
| 3,000,838 | 9/1961 | Michael | 252—441 |
| 3,003,972 | 10/1961 | Haensel | 252—441 |
| 3,116,259 | 12/1963 | Geerts et al. | 252—439 |

FOREIGN PATENTS

| | | |
|---|---|---|
| 1,299,388 | 7/1962 | France. |

OTHER REFERENCES

Bordwell et al., Journal American Chemical Society, vol. 77, No. 3, pp. 572–577.

ALPHONSO D. SULLIVAN, *Primary Examiner.*

UNITED STATES PATENT OFFICE
CERTIFICATE OF CORRECTION

Patent No. 3,218,267                                                          November 16, 1965

Anthony George Goble et al.

It is hereby certified that error appears in the above numbered patent requiring correction and that the said Letters Patent should read as corrected below.

Column 1, line 29, after "the" insert -- alumina without the production of free --.

Signed and sealed this 4th day of October 1966.

(SEAL)
Attest:

ERNEST W. SWIDER                                            EDWARD J. BRENNER
Attesting Officer                                                Commissioner of Patents